United States Statutory Invention Registration [19]

[11] Reg. Number: H409

Stanley [43] Published: Jan. 5, 1988

[54] SYNTHESIS OF CADMIUM SULFIDE USING THE LASER-INDUCED REACTION OF DIALKYLCADMIUM AND ORGANOSULFUR COMPOUNDS

[75] Inventor: Ann E. Stanley, Huntsville, Ala.

[73] Assignee: The United States of America as represented by the Secretary of the Army, Washington, D.C.

[21] Appl. No.: 67,770

[22] Filed: Jun. 29, 1987

[51] Int. Cl.[4] ..... B01J 27/04

[52] U.S. Cl. ..... 204/157.41; 204/157.49

*Primary Examiner*—John F. Terapane
*Assistant Examiner*—Susan Wolffe
*Attorney, Agent, or Firm*—John C. Garvin, Jr.; Freddie M. Bush

[57] ABSTRACT

Cadmium sulfide is formed successfully from the laser-induced chemical reaction between a first reactant of a dialkylcadmium and a second reactant of a dialkylsulfide. Infrared laser radiation in the range of 10.4 or 9.4 micrometers is provided by a continuous-wave $CO_2$ laser. In single line operation, output powers between 10 and 150 watts/centimeters square ($W/cm^2$) are obtained by variation of the $CO_2$-$N_2$-He gas mixture in the laser. The process procedure and sample handling is accomplished using standard vacuum line techniques. The irradiation of dimethylsulfide at R(18) of (00°1-10°0) for 5 seconds at 100 $W/cm^2$ produced the products methane, ethane, and sulfur. A mixture of a dialkylsulfide $(CH_3)_2S$, and a dialkylcadmium $(CH_3)_2Cd$ is irradiated at R(18) of (00°1-10°0), 979 $cm^{-1}$ for a total of 5 seconds at 100 $W/cm^2$ to form CdS on the windows of the reaction cell. A higher yield of CdS is obtained when the sensitizer $SR_6$ is added to the mixture of the reactants. Excitation of the mixture occurs using P(20) of (00°1-10°0) at 944 $cm^{-1}$ for 5 seconds at 100 $W/cm^2$. The representative torr pressures of the reactants are for $(CH_3)_2Cd$ 33 torr combined with $(CH_3)_2S$ to total 100 torr pressure prior to irradiation. The efficiency when $SF_6$ (6 torr) plus $(CH_3)_2Cd$ (22.4 torr) is combined with 54.5 torr of $(CH_3)_2S$ and irradiated is improved.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYNTHESIS OF CADMIUM SULFIDE USING THE LASER-INDUCED REACTION OF DIALKYLCADMIUM AND ORGANOSULFUR COMPOUNDS

DEDICATORY CLAUSE

The invention described herein may be manufactured, used, and licensed by or for the Government for governmental purposes without the payment to me of any royalties thereon.

BACKGROUND OF THE INVENTION

Cadmium sulfide single crystal is used as a UV detector and in combination with other materials indium antimony (InSb) as a detector for UV and IR detectors. The final product material must meet a very strict set of specifications with respect to spectral transmission, mobility, resistivity, and detector lifetime. The single crystals are prepared using a "proprietary" process which involves chemical vapor deposition by Eagle Picher Laboratories, who is at present the single supplier. It is concluded that the characteristics of the single crystal are drastically affected by the purity of the cadmium sulfide powder used as a precursor to the single crystal. The basis for this conclusion is supported by P. D. Fochs et al, Report No. AE-1-G.1453, Clevite Corporation, Report No. FTD-TT-65-555, General Electric Company, Report No. SR-2,65gc-03 136, and Bell and Howell Research center, Technical Report AF 33-615-276.

Because of the high priority and importance of high purity of precursor material for a single crystal product, a variety of studies have been conducted over the past twenty years with the objective of perfecting a process which would produce purer starting material for ultimate growth of single crystals with specific properties. Predominant leaders in this area include Eagle Picher Laboratories and the Clevite Corporation Research Laboratory. The synthetic work for cadmium sulfide performed by these companies involved the chemical reaction of the elements with thermal activation as necessary.

Hydrogen sulfide is known to be acidic in solution; however, a reaction in liquid solution to yield cadmium sulfide is not desired to be pursued since the required level of purity of the finished product by this route cannot be achieved.

A laser-induced chemical reaction to yield high purity cadmium sulfide is worthy of consideration and further investigation; therefore, an object of this invention is to provide a laser-induced reaction to precisely produce sulfur to react with cadmium from an organocadmium compound selected from a dialkylcadmium compound to yield a high purity thermodynamically stable cadmium sulfide.

A further object of this invention is to provide a laser-induced chemical reaction between a dialkylsulfide and a dialkylcadmium compound to yield high purity thermodynamically stable cadmium sulfide.

Still, a further object of this invention is to provide a laser-induced chemical reaction wherein the compound $SF_6$ is mixed with a dialkylsulfide compound and a dialkylcadmium compound wherein the compound $SF_6$ has a fundamental which allows the excitation to occur by absorption of laser energy followed by collisional transfer to effect a higher yield of high purity thermodynamically stable cadmium sulfide.

SUMMARY OF THE INVENTION

A method of synthesis comprises a laser-induced chemical reaction between a first reactant of a dialkylcadmium and a second reactant of a dialkylsulfide to form high purity cadmium sulfide. The reactants are induced to react by laser irradiation wherein the reaction is carried out in a stainless steel cell (5×10 cm) equipped with O-ring seals for securing windows (5 cm diameter) onto the cells. Potassium chloride windows are used on the short pathlength (5 cm) for recording the infrared spectra. A zirconium selenium (ZrSe) window is used to transmit the incident infrared radiation; however, since only about 65% of the incident radiation is transmitted through the ZrSe window the laser power available to the sample must be adjusted accordingly.

Infrared laser radiation in the range of 10.4 or 9.4 micrometers is provided by a Coherent Radiation Laboratories model 41 continuous-wave $CO_2$ laser. In single line operation, output powers between 10 and 150 $W/cm^2$ are obtained by variation of the $CO_2$-$N_2$-He gas mixture in the laser.

Dimethylsulfide is irradiated at R(18) of (00°1-10°0) for 5 seconds at 100 $W/cm^2$. The products formed are methane, ethane, and sulfur.

A mixture of a dialkylsulfide, $(CH_3)_2S$, and a dialkylcadmium, $(CH_3)_2Cd$ is irradiated at R(18) of (00°1-10°0), 979 $cm^{-1}$ for a total of 5 seconds at 100 $W/cm^2$. CdS is formed on the windows and methane and ethane are other products that remain in the gaseous mixture. A higher yield of CdS is obtained when $SF_6$ is added to the mixture of the reactants. Excitation of the $SF_6$, $(CH_3)_2S$, and $(CH_3)_2Cd$ mixture occurs using P(20) of (00°1-10°0) at 944 $cm^{-1}$ for 5 seconds at 100 $W/cm^2$. Using $SF_6$ results in an enhanced reaction of $(CH_3)_2S$ and $(CH_3)_2Cd$ to produce a higher yield of high purity CdS.

DESCRIPTION OF THE PREFERRED EMBODIMENT

Figure 1:
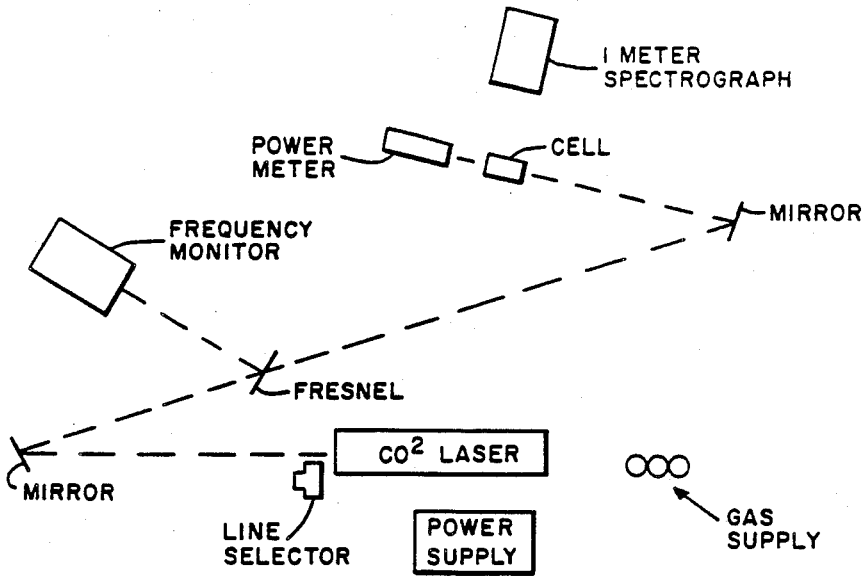
FIG. 1 depicts a typical experimental setup for laser-induced chemical reaction and monitoring the induced reaction.

The preparation of cadmium sulfide powder using laser photochemistry is achieved by employing the typical setup depicted in FIG. 1 of the drawing.

An organosulfur compound is used as a reactant to precisely produce sulfur which reacts with cadmium released from another reactant, a dialkylcadmium, to produce high purity cadmium sulfide.

Sample handling is accomplished using standard vacuum line techniques. The reactants are gaseous products, and the gas phase reaction which is induced by infrared laser radiation is carried out in stainless steel cells (5×10 cm) equipped with O-ring seals for securing windows (5 cm diameter) onto the cells. Potassium chloride windows are used on the short pathlength (5 cm) for recording the infrared spectra. A zirconium selenium (ZrSe) window is used to transmit the incident infrared radiation; however, since only about 64% of the incident radiation is transmitted through the ZrSe window the laser power available to the sample must be adjusted accordingly.

Infrared spectra are recorded on a Mattson Sirius 100 interferometer equipped with a water-cooled carborundum source, iris aperture, potassium bromide (KBr) beamsplitter, and triglycine sulfate (TGS) detector. Interferograms are transformed after applying a triangular apodization function with an effective spectral resolution of 1.0 $cm^{-1}$. This resolution is sufficient to allow unequivocal identification of all the products as well as to monitor the decrease of the starting material from its infrared absorption bands.

Infrared laser radiation in the range of 10.4 or 9.4 micrometers is provided by a Coherent Radiation Laboratories model 41 continous-wave $CO_2$ laser. The exact laser frequencies are verified using an Optical Engineering $CO_2$ spectrum analyzer. In single line operation, output powers between 10 and 150 $W/cm^2$ are obtained by variation of the $CO_2$-$N_2$-He gas mixture in the laser. The beam size is measured from burn patterns and is found to be approximately circular with a 4 mm diameter.

EXAMPLE 1

Dimethylsulfide is admitted to the reaction cell and decomposed following irradiation at R(18) of (00°1–10°0) for 5 seconds at 100 watts/centimeters square (100 $W/cm^2$). The products formed are methane, ethene, and sulfur.

EXAMPLE 2

A mixture of the dialkylsulfide, $(CH_3)_2S$, and the dialkylcadmium, $(CH_3)_2Cd$ in the reaction cell is irradiated at R(18) of (00°1–10°0), 979 $cm^{-1}$ for a total of 5 seconds at 100 $W/cm^2$. CdS is formed on the window and methane and ethane remains in the gaseous mixture.

Sulfur hexafluoride is mixed with $(CH_3)_2S$ and $(CH_3)_2Cd$ in the reaction cell as an intensifier. $SF_6$ has a fundamental at 944 $cm^{-1}$ which allows the excitation to occur by absorption of energy followed by collisional transfer to other molecules. Excitation occurred using P(20) of (00°1–10°0) at 944 $cm^{-1}$ for 5 seconds at 100 $W/cm^2$. The result of using $SF_6$ is the enhanced reaction of the excited elements of said $(CH_3)_2S$ and $(CH_3)_2Cd$ to produce CdS in larger quantities.

Figure 2:
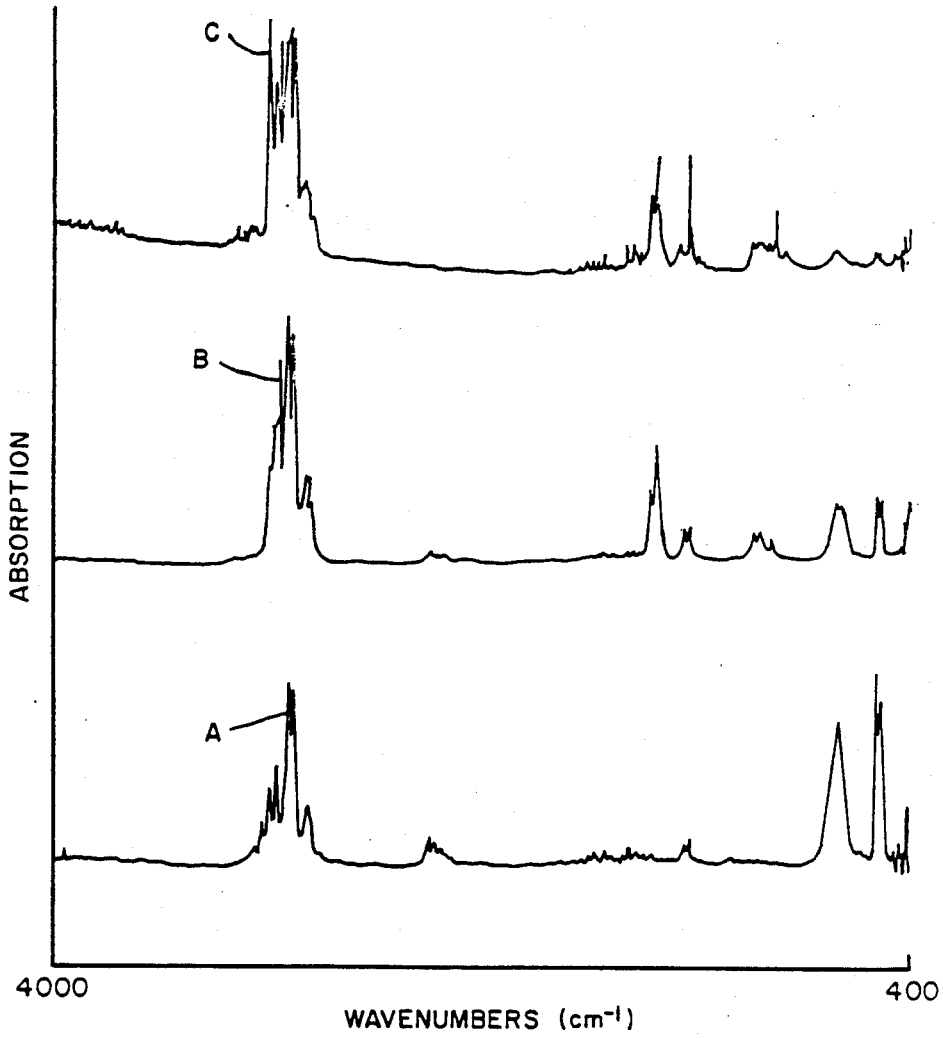
FIG. 2 depicts infrared spectra curves A, B, and C which respectively represent $(CH_3)_2Cd$ at 33 torr, $(CH_3)_2Cd$ and $(CH_3)_2S$ mixed to form a mixture at 100 torr, and the mixture of $(CH_3)_2Cd$ and $(CH_3)_2S$ after irradiation.
Figure 3:
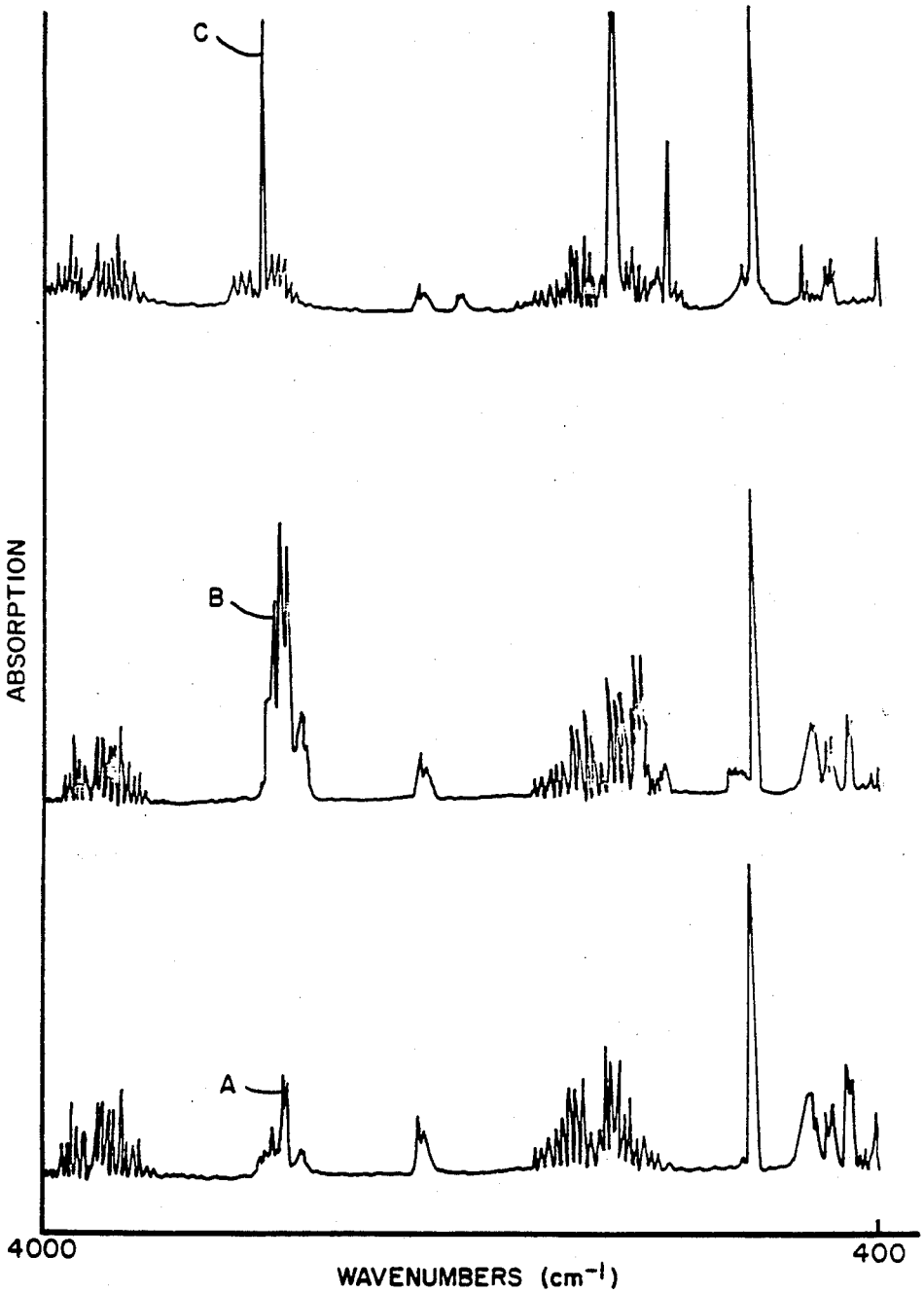
FIG. 3 depicts infrared spectra curves A, B, and C representing the result of the laser-induced reaction of $(CH_3)_2S$ and $(CH_3)_2Cd$ as enhanced with the sensitizer $SF_6$.

Table I below identifies the frequencies used to identify the products depicted by the infrared spectra curves A, B, and C of FIG. 2.

TABLE I

VIBRATIONAL FREQUENCIES ($cm^{-1}$)[a] of $(CH_3)_2Cd$, $(CH_3)_2S$ and REACTION PRODUCTS

| $(CH_3)_2Cd$ | $(CH_3)_2Cd$ + $(CH_3)_2S$ | Mixture After Irradiation | Identity | Reference |
|---|---|---|---|---|
| | | 3016 | $CH_4$ | (c) |
| 2900 | 2990 | 2990 | X,Y(b) | (d)(e) |
| 2980 | 2980 | 2980 | X,Y | |
| 2973 | 2973 | 2973 | X,Y | |
| 2925 | 2925 | 2925 | X,Y | |
| 2918 | 2918 | 2918 | X,Y | |
| | 2868 | 2870 | X,Y | |
| 2855 | 2855 | 2855 | X,Y | |
| | 2838 | | | |

TABLE I-continued

VIBRATIONAL FREQUENCIES ($cm^{-1}$)[a] of $(CH_3)_2Cd$, $(CH_3)_2S$ and REACTION PRODUCTS

| $(CH_3)_2Cd$ | $(CH_3)_2Cd$ + $(CH_3)_2S$ | Mixture After Irradiation | Identity | Reference |
|---|---|---|---|---|
| 2349 | 2349 | 2349 | X,Y | |
| | 1457 | | | |
| | 1441 | | | |
| | 1433 | | | |
| 1338 | 1338 | 1338 | X,Y, | |
| 1326 | 1326 | 1326 | X,Y | |
| 1314 | 1314 | 1314 | X,Y | |
| 1305 | 1305 | 1302 | X,Y | |
| 1165 | 1045 | 1045 | X,Y | |
| | 1025 | 1021 | X,Y | |
| | | 948 | Ethylene (c) | |
| | 730 | 730 | | |
| | 704 | 704 | | |
| | 691 | 691 | | |
| | 669 | 669 | | |
| 544 | 544 | 544 | | |
| 524 | 524 | 524 | | |

[a]Only the frequencies of major bands are given (b) X = $(CH_3)_2Cd$; Y = $(CH_3)_2S$ (c) Herzberg, G., Infrared and Raman Spectra (Van Nostrand Reinhold, New York, 1945), First Edition.

(d) Bakhe, A. M. W., J. Mol. Spectrosc. 41, 1–19 (1972).

(e) P. Groner, J. F. Sullivan, and J. R. Durig, in Vibrational Spectra and Structures, edited by J. R. Durig (Elsevier, Amsterdam, 1986), Vol. 9, Chap. 6.

Table II below identifies the vibrational frequencies ($cm^{-1}$) used to identify the reactants and reaction products of $(CH_3)_2S$, $(CH_3)_2Cd$, and $SF_6$.

TABLE II

VIBRATIONAL FREQUENCIES ($cm^{-1}$)[a] of $(CH_3)_2S$, $(CH_3)_2Cd$ and $SF_6$ and REACTION PRODUCTS.

| $(CH_3)_2Cd$ + $SF_6$ | Mixture + $(CH_3)_2S$ | After Irradiation | Identity | Reference |
|---|---|---|---|---|
| | | 3016 (.9) | $CH_4$ | (e) |
| 2990 | | 2988 (.2) | X,Y(b) | (d),(c) |
| 2980 | | 2979 (.2) | X,Y | |
| 2970 | 2970 | 2969 (.2) | X,Y | |
| | | 2958 (.2) | | |
| 2951 | 2945 | 2948 (.2) | | |
| | 2940 | 2938 (.2) | | |
| | 2930 | 2927 (.2) | | |
| | 2916 | 2917 (.2) | | |
| | 2864 | | | |
| | 2851 | | | |
| | 2840 | | | |
| 1558 | 1558 | 1558 (.5) | | |
| 1541 | 1541 | 1541 (2.9) | | |
| | | 1532 (.4) | | |
| 1521 | | 1523 (1.3) | | |
| 1507 | 1507 | 1508 (.6) | | |
| | | 1489 (.2) | | |
| | | 1473 (.2) | | |
| 1457 | 1457 | 1457 (.2) | X,Y | (d),(c) |
| | 1437 | | | |
| | 1430 | | | |
| | | 1362 | X,Y | (d),(c) |
| | 1339 | 1340 | | |
| | 1314 | | | |
| | 1304 | 1304 | | |
| 945.6 | 945 | 945 | $SF_6$ | (c) |
| | 930 | 930 | | |
| 724 | | 729 | | |
| | | 711 | | |
| 705 | 704 | | | |
| 692 | 691 | | | |
| 669 | 669 | | | |
| 626 | 626 | 629 | | |
| 614 | 615 | 614 | | |
| 603 | 603 | 603 | | |
| 544 | 544 | | | |

TABLE II-continued

VIBRATIONAL FREQUENCIES ($cm^{-1}$)[a] of $(CH_3)_2S$, $(CH_3)_2Cd$ and $SF_6$ and REACTION PRODUCTS.

| $(CH_3)_2Cd + SF_6$ | Mixture + $(CH_3)_2S$ | After Irradiation | Identity | Reference |
|---|---|---|---|---|
| 527 | 527 | | | |

[a]Only the frequencies of a major bands are given.
(b) X = $(CH_3)_2Cd$; Y = $(CH_3)_2S$
(c) Herzberg, G., Infrared and Raman Spectra (Van Nostrand Reinhold, New York, 1945), First Edition.
(d) Bakhe, A. M. W. J. Mol. Spectrosc. 41, 1-19 (1972).
(e) P. Groner, J. F. Sullivan, and J. R. Durig, in Vibrational Spectra and Structures, edited by J. R. Durig (Elsevier, Amsterdam, 1986), Vol. 9, Chap. 6.

I claim:

1. A method for the synthesis of cadmium sulfide by the laser-induced chemical reaction between a first reactant selected from a dialkylcadmium compound and a second reactant selected from a dialkylsulfide compound, said method comprising:

(i) providing a stainless steel reaction cell adapted for use with vacuum line techniques and equipped with O-ring seals for securing ZrSe windows onto said reaction cell for transmitting laser radiation and for securing potassium chloride windows onto said reaction cell to achieve monitoring of said laser-induced chemical reaction including the reaction products formed;

(ii) metering said first reactant of said dialkylcadmium compound and said second reactant of said dialkylsulfide into said reaction cell to form a reaction mixture of said dialkycadmium compound in the range from about 14 to about 32 torr and of said dialkylsulfide compound in the range from about 30 to about 279 torr;

(iii) irradiating said reaction mixture with infrared laser radiation in the range of 10.4 or 9.4 micrometers as provided by a continuous-wave $CO_2$ laser operating in a predetermined single line operation with an output power between about 10 and 150 watts per centimeter square ($W/cm^2$) to form reaction products including a solid compound: and, (iv) recovering said solid compound which is high purity thermodynamically stable cadmium sulfide.

2. The method of claim 1 wherein said dialkylcadmium is dimethylsulfide and wherein said reaction mixture comprises said dimethylcadmium of about 3 torr and said dimethylsulfide of about 100 torr.

3. The method of claim 1 wherein said irradiating of said reaction mixture is achieved with said predetermined single line operation at R(18) of (00°1-10°0) for about 5 seconds at 975 $cm^{-1}$, said output power is 100 $W/cm^2$, and wherein said dialkylcadmium compound is dimethylcadmium of about 33 torr and said dialkylsulfide compound is dimethylsulfide of about 100 torr which comprises said first and second reactant respectively of said reaction mixture.

4. The method of claim 1 wherein said reaction mixture additionally comprises $SF_6$ as an intensifier which has a fundamental at 944 $cm^{-1}$ to allow excitation to occur by absorption of energy followed by collisional transfer to said first reactant and to said second reactant to achieve enchanced reaction of the excited elements of said first and said reactants to produce said cadmium sulfide in higher yield.

5. The method of claim 4 wherein said reaction mixture comprises said $SF_6$ of about 6 torr, said first reactant of said dialkylcadmium is dimethylcadmium of about 22.4 torr, said second reactant of said dialkylsulfide is dimethylsulfide of about 54.5 torr, and wherein said irradiation of said reaction mixture is achieved with said predetermined single line operation at P(20) of (00°1-10°0) for about 5 seconds at said output power which is 100 $W/cm^2$.

* * * * *